United States Patent [19]

Swint et al.

[11] Patent Number: 4,816,137
[45] Date of Patent: Mar. 28, 1989

[54] METHOD FOR CRACKING RESIDUAL OILS

[75] Inventors: Richard E. Swint, Littleton; Robert J. Newman, Englewood, both of Colo.

[73] Assignee: Total Engineering and Research Company, Denver, Colo.

[21] Appl. No.: 911,078

[22] Filed: Dec. 23, 1986

Related U.S. Application Data

[63] Continuation of Ser. No. 498,856, May 27, 1983, abandoned.

[51] Int. Cl.4 .............................................. C10G 35/00
[52] U.S. Cl. .............................. 208/154; 208/DIG. 1; 208/153
[58] Field of Search ............... 208/164, 154, 153, 159, 208/DIG. 1; 422/144; 251/30

[56] References Cited

U.S. PATENT DOCUMENTS

| 2,071,102 | 3/1954 | Jewell | 208/164 X |
|---|---|---|---|
| 2,883,332 | 4/1959 | Wickham | 422/144 X |
| 2,962,436 | 11/1960 | Jewell | 208/164 |
| 3,011,969 | 12/1961 | Mader | 208/164 X |
| 3,152,064 | 10/1964 | Osborne | 208/164 X |
| 3,290,241 | 12/1966 | Wickham et al. | 208/164 X |
| 3,378,483 | 4/1968 | Worrell et al. | 422/144 X |
| 3,578,284 | 5/1971 | Martini | 251/30 X |

Primary Examiner—Glenn Caldarola
Attorney, Agent, or Firm—Sheridan, Ross & McIntosh

[57] ABSTRACT

A process is disclosed for controlling movement of a vertically movable plug valve with respect to a bottom open end of a riser conduit of a catalytic conversion apparatus during startup and shutdown. The method involves sensing the pressure between the communicating surfaces of the plug valve and the riser conduit as the riser conduit expands or contracts due to thermal changes experienced during startup and shutdown. When the riser conduit expands and causes the pressure to exceed a preselected range, the position of the plug valve with respect to the riser conduit is lowered to reduce the pressure to within the range. When the riser conduit contracts and causes the pressure to fall below the preselected range, the position of the plug valve with respect to the riser conduit is raised to prevent catalyst flow through the valve.

6 Claims, 6 Drawing Sheets

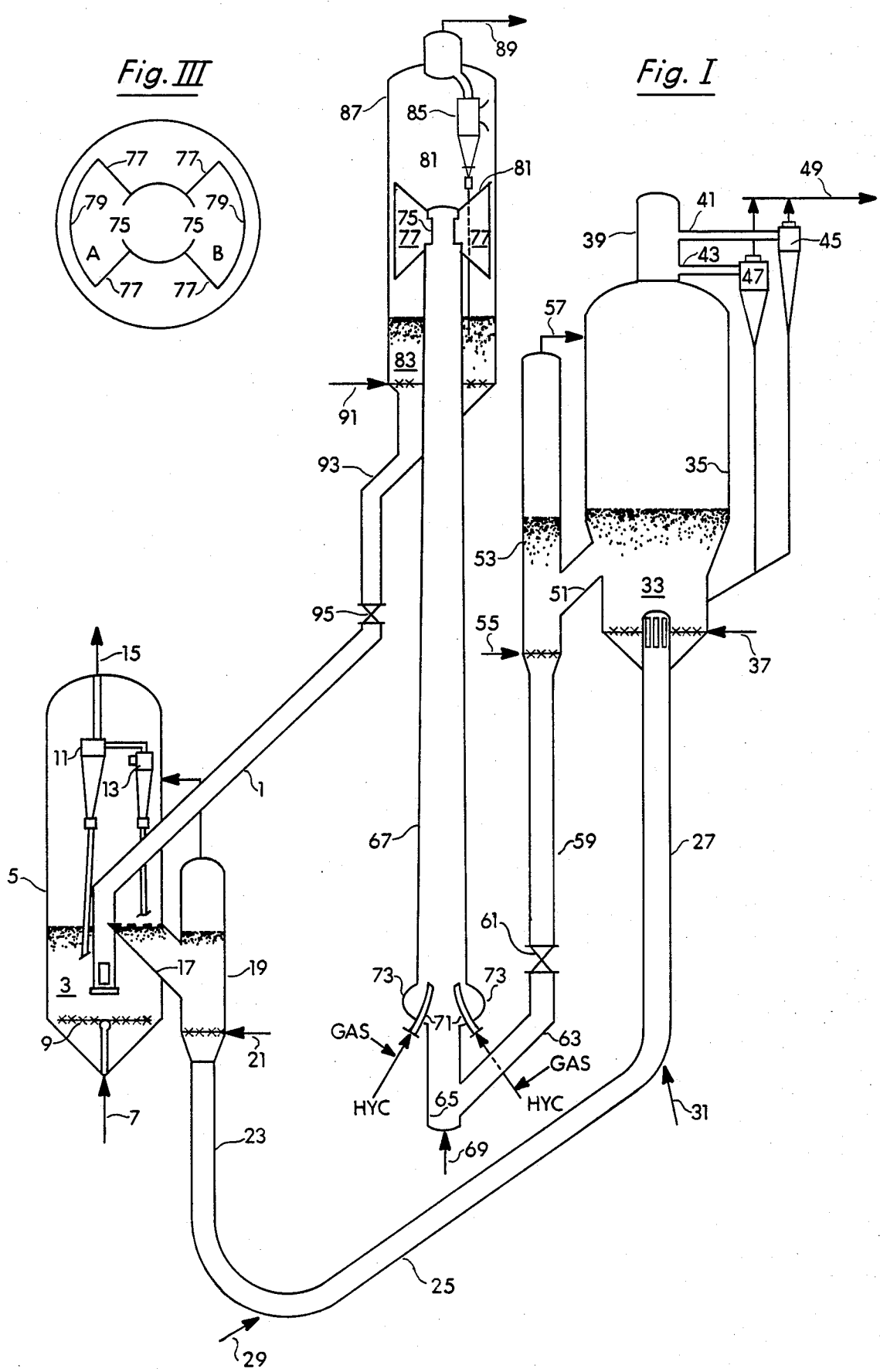

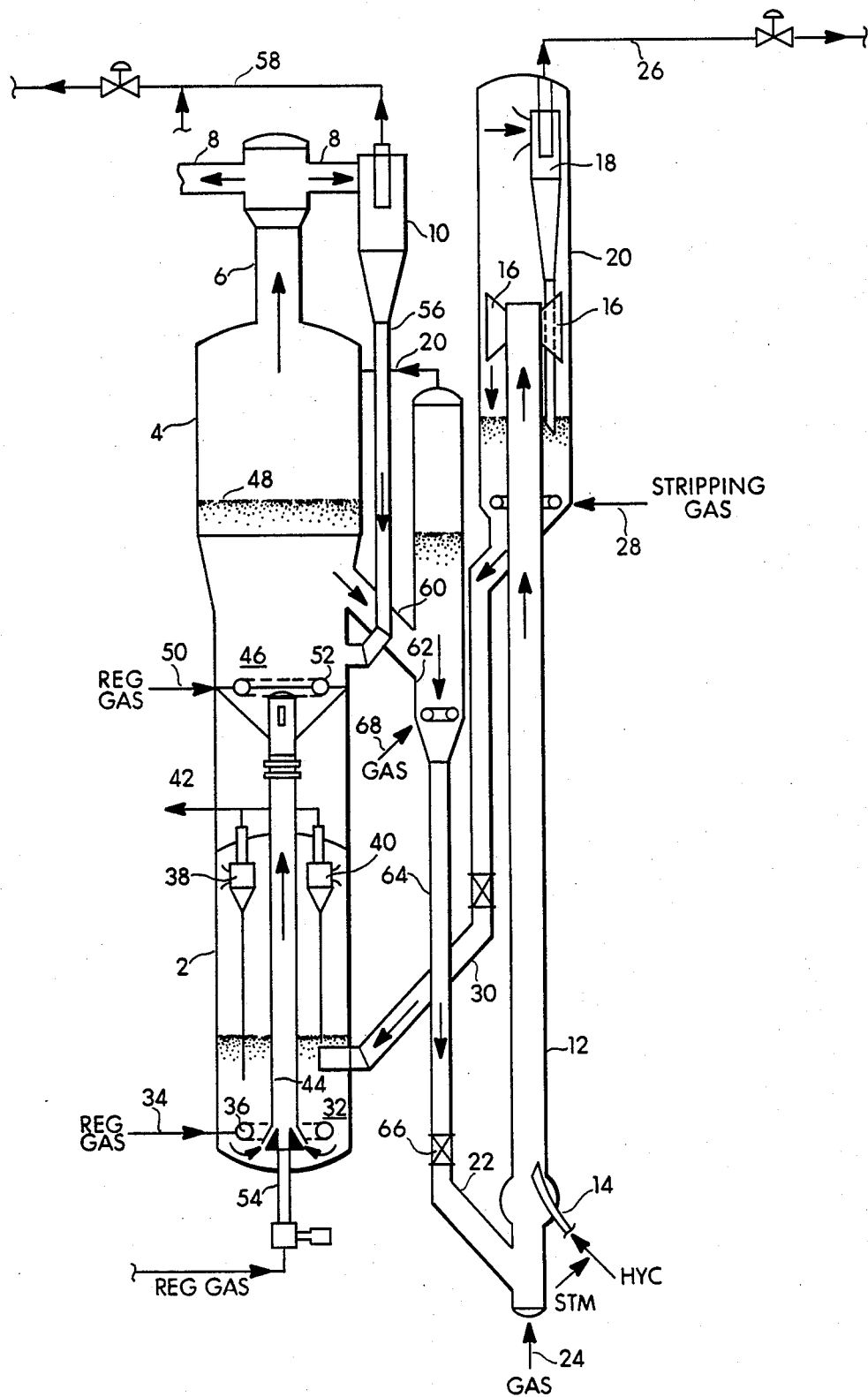
Fig. II

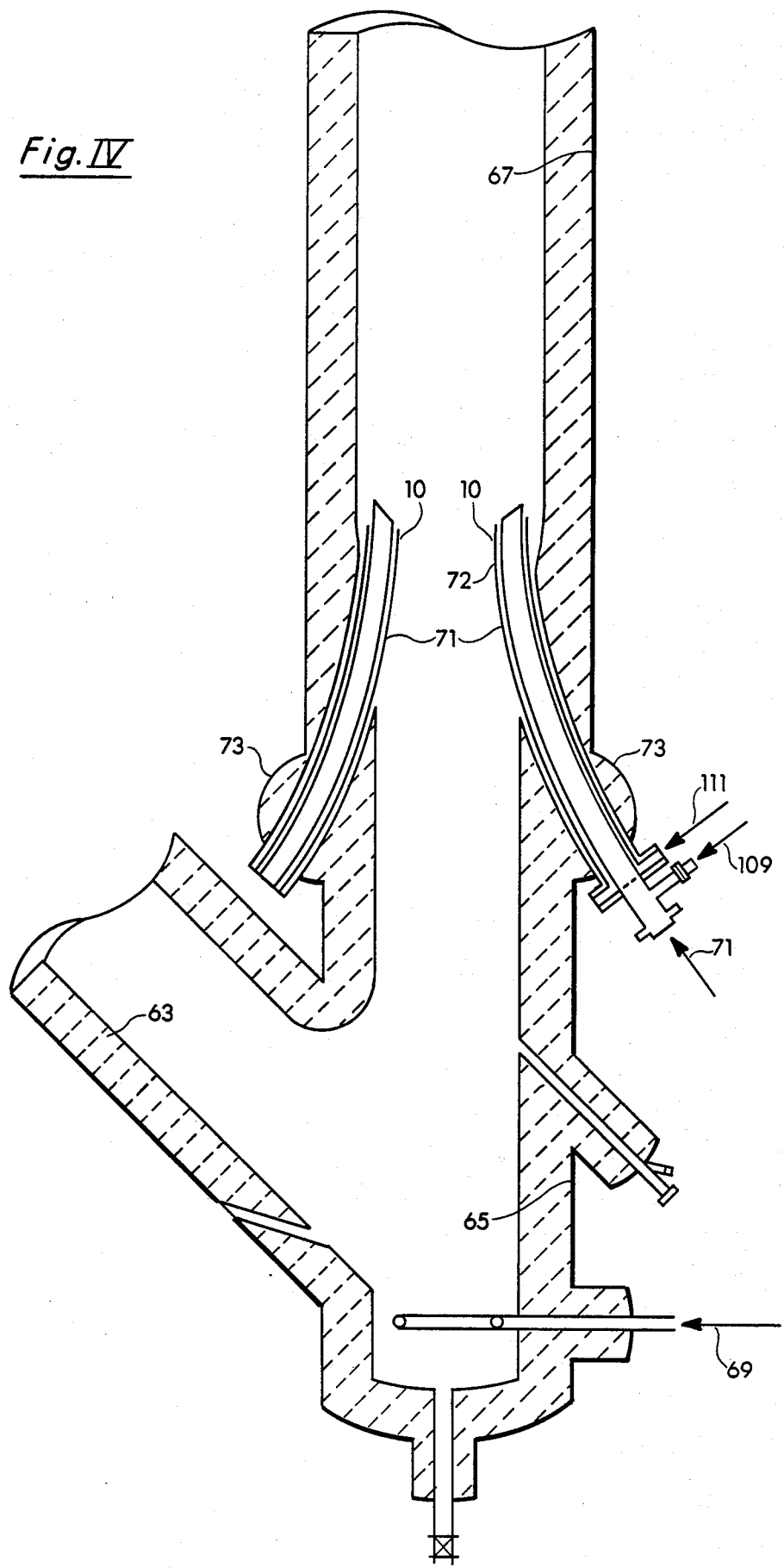
Fig. IV

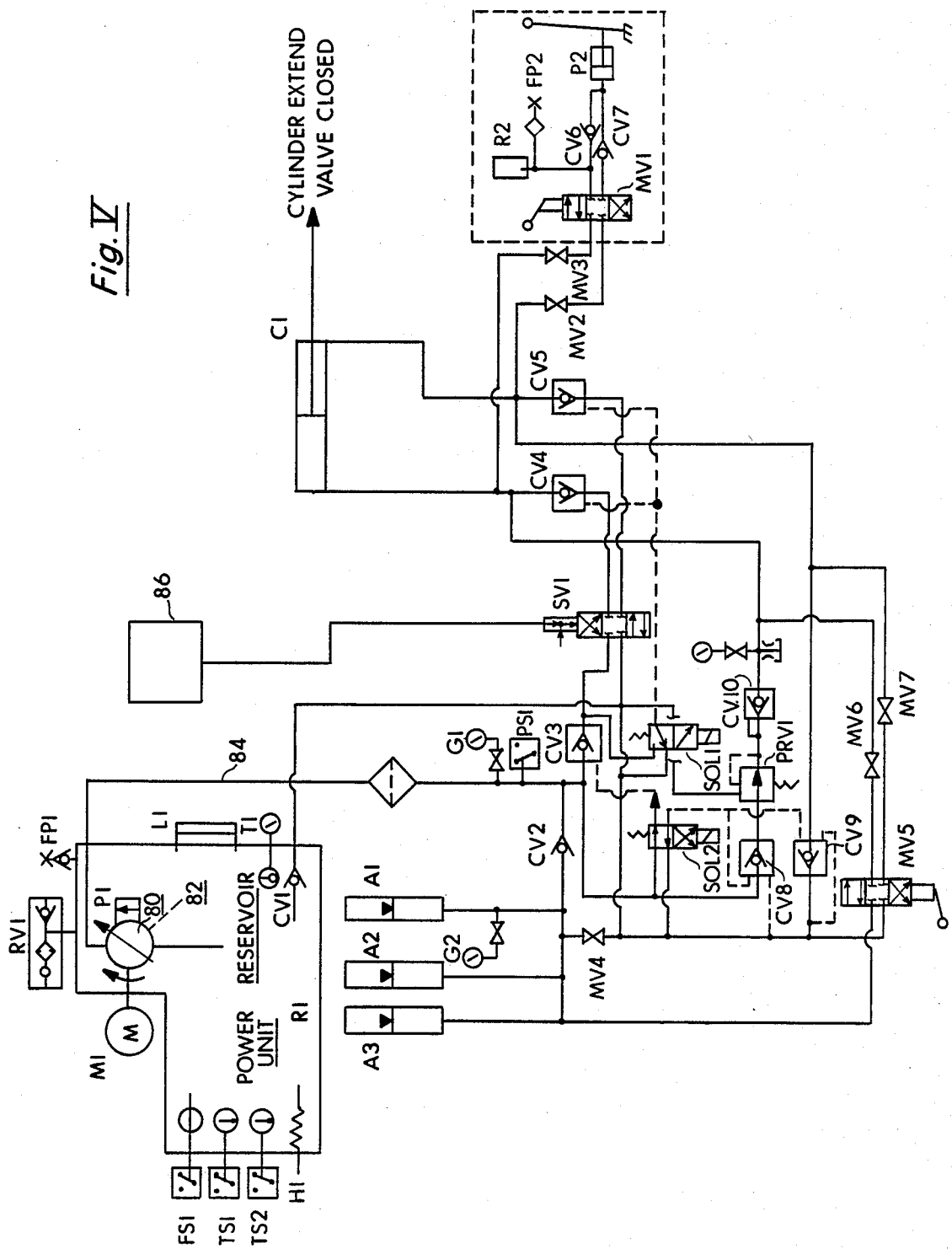
Fig. V

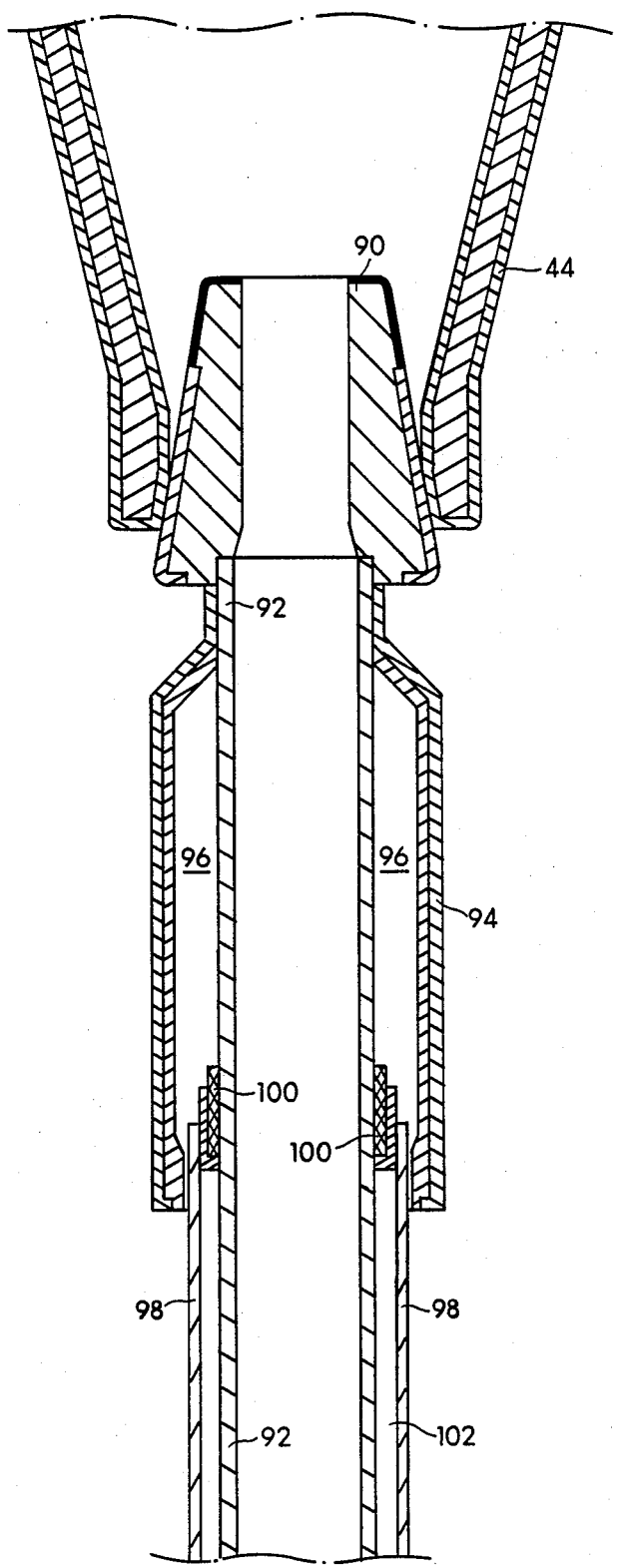
Fig. VI

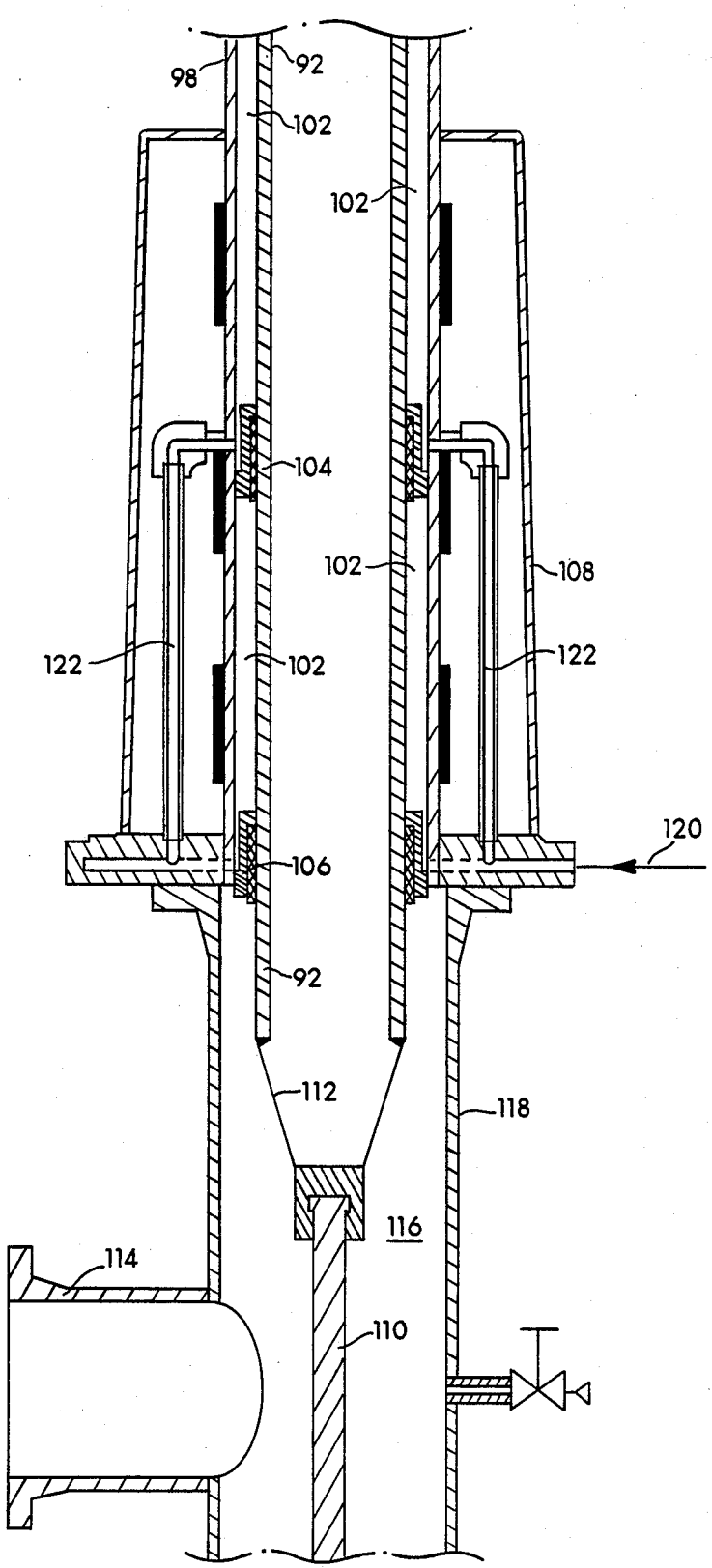
Fig. VII

METHOD FOR CRACKING RESIDUAL OILS

This is a continuation, of application Ser. No. 498,856, filed May 27, 1983 now abandoned.

The prior art identifies residual oils as residual, reduced crude oils, atmospheric tower bottoms, topped crudes, vacuum resids, or simply heavy oils. Such high boiling portions of crude oils are also known as comprising very refractory components, such as polycyclic aromatics and asphaltenes, which are considered difficult to catalytically crack to form high yields of gasoline plus lower and higher boiling hydrocarbon fractions because of the deposition of large amounts of coke on the catalyst. Furthermore, metal contaminants in the heavy oil fractions of crude oil comprising vanadium, nickel, copper, iron, etc. are deposited on and/or in the pores of the catalyst, thereby further poisoning and/or inactivating the catalyst so employed. Indeed the prior art considers that the effect of the coking tendencies of the heavy oil fractions plus the heavy metals effect are so overpowering that the resulting product yield structures are unacceptable in terms of industry ecomonics.

In view of prior art identified problems for processing heavy crudes and bottom fractions thereof, comprising such contaminants, it has been previously proposed to effect a separation of materials comprising the residual or heaviest fractions or to effect a preconversion of the heaviest and undesirable components. Different techniques to accomplish the desired separation, such as vacuum distillation, solvent extraction, hydro9enation or certain thermal cracking process, have been relied upon in the prior art for contaminant separation or control. Adsorption of undesired components, particularly metal components, on particulate material of little or no cracking activity has also been employed. Thermal cracking, such as delayed and fluid coking, as well as visbreaking operations, have been employed to upgrade heavy residual oils; however, the resultant products boiling above 400° F. have not proven to be particularly good feed stocks for fluid catalytic cracking due to resultant high concentrations of polynuclear compounds.

Residual oil comprising relatively high boiling fractions of crude oil obtained as atmospheric tower bottoms and/or vacuum tower bottoms contained therein are, therefore, regarded as distress stocks by the petroleum industry because the oils contain large quantities of components generally considered to have coke forming tendencies as well as heavy metals components. For example, a residual oil may contain a carbon residue in excess of 0.6% by weight, and this characteristic is considered by the industry to contribute to producing high additive coke in a cracking operation and along with the high metals levels will operate to rapidly deactivate the cracking catalyst, leading to uneconomic yield results. Hence, the prior art has tended to exclude these materials from fluid cracking feeds.

Residual oils for the purpose of this invention can include materials boiling from 400° F. to the final end point of crude oil, in excess of 1800° F. Contained in this broad boiling range feed stock can be light gas oils boiling from about 400° F. to 700° F., medium gas oils boiling from about 600° F. to 850° F., heavy gas oils boiling from about 600° F. to 1200° F., and components boiling beyond 1200° F. up to the final boiling point of the crude oil, including carbon producing components, such as polycyclic aromatics, asphaltenes and metal contaminants, as well as whole crudes. Separately prepared stocks such as those prepared by solvent extraction of hydrogenated stocks may also be included as feed to the process.

The Invention

This invention relates to the simultaneous conversion of both the high and low boiling components contained in residual oils with high selectivity to gasoline and lighter components and with low coke production. The past problems related to high regenerator and catalyst temperatures are substantially obviated by the processing concepts of the invention. Indeed this invention encourages high catalyst regeneration temperatures and takes advantage of these high temperatures of the catalyst to cause the desired cracking reactions to occur, at high conversion and high selectivity to gasoline and products which are gasoline precursors on a once through basis, without excessive coke formation. Fluid catalytic cracking is successfully practiced with feed stocks derived by distillation, solvent extraction and by hydrogenation, up to distillation ranges capable of instantaneous vaporization by hot regenerated catalyst. Experiments with cracking of the high boiling residual hydrocarbon components have met with less than desired results due in substantial measure to the fact that the prior experimentors were considerably constrained and failed to appreciate that success is only possible if substantially instantaneous and complete atomization/vaporization is achieved by the initial contact of the feed with very hot catalyst at a temperature above the pseudocritical temperature of the feed. This means that as the boiling range of a gas oil feed is increased by inclusion of residua, the catalyst temperature must also be increased.

The prior art has not only failed to recognize this concept, and thus ignored these facts, but has deliberately restrained the process from achieving the necessary high catalyst temperature due to two factors:

(1) Metallurgical limits of the regeneration equipment, and (2) Thermal stability of the catalyst.

Current available fluid cracking art tends to agree that the maximum practical temperature of regeneration and, therefore, the resulting regenerated catalyst temperature should be restricted to within the range of about 1300° F.–1400° F. even though temperatures up to 1600° F. are broadly recited. The temperature restriction of 1300° F.–1400° F. in reality necessarily restricts therefore the feeds charged to catalytic crackers, to distilled, solvent extracted and hydrogenated gas oil stocks in order to achieve desired conversion levels.

The present invention deals with providing an arrangement of apparatus or equipment and techniques of using, which will permit extending the temperature of regeneration up to at least 1800° F. without unduly impairing catalyst activity. The invention also identifies an array of equipment or apparatus means capable of withstanding the severe temperature operations contemplated by the invention.

Thus, for example, the undistilled portion of crude oil boiling from about 400° F. or higher, up to the crude oil end point such as topped crude oils can be cracked under conditions achieving high conversions of the oil feed to form gasoline and lighter hydrocarbons with yield results comparable to prior art gas oil cracking including comparable coke makes. The need for expensive feed preparation techniques and apparatus in the form of distillation, solvent extraction, hydrogenation or various thermal processes is thus obviated.

The products produced from the process of the invention will be similar to those derived from more conventional gas oil fluid catalytic cracking operations. That is, $C_2$'s and lighter gases, $C_3$ and $C_4$ olefins, and paraffins, gasoline boiling from $C_5$'s to 430° F. end point and cracked gas oils are obtained. The cracked gas oils thus obtained and known as light and heavy cycle oils or decanted oil are of such a quality that they can be hydrogenated for sale as low sulphur fuel oils, mildly hydrogenated and returned to the fluid catalytic cracker for more complete conversion to gasoline or preferably, hydrocracked more completely to gasoline boiling components.

Hydrocracking of the cracked gas oils obtained as herein described to form gasoline coupled with alkylation of the catalytic $C_3$'s and $C_4$'s results in yields of gasoline per barrel of 400° F.+crude oil residuum charged to the catalytic cracker of up to 125% plus 3-4% propane. Such an overall processing sequence is in energy balance if not a net exporter of fuel gas and steam to other applications. The energy balance includes that required for the crude oil topping operation.

A most important parameter for successful residual oil cracking is to be ensured for a most complete intimate flash contact and substantially complete atomization/vaporization of the feed substantially upon contact with the hot catalyst. The residual higher boiling portion of the feed must also be substantially vaporized upon contact with hot regenerated catalyst, because only by more complete atomized vaporization of the feed components can the feed be more completely cracked to gasoline yielding components. What does not vaporize remains essentially unconverted resulting in high yields of catalytic cycle oils and/or is adsorbed on the hot catalyst surface and tends to be converted particularly to coke, thereby resulting in a loss of gasoline yield and a lowering of catalyst activity. For optimum conversion, the mix temperature should at least be equal to and preferably above the pseudo-critical temperature of the feed charged but not so much higher than undesired overcracking occurs.

The feed preheat temperature, the temperature of the hot regenerated catalyst, the volume of diluent such as steam injected with the feed and the unit operating pressure are the four main operating variables readily available to achieve the conditions necessary to accomplish substantially complete vaporization of the feed and, in turn, achieve a high selectivity conversion to gasoline and lighter compounds and the production of heavier oils of a quality suitable for hydrocracking to additional gasoline.

An additional desired operating parameter is that of providing an equilibrium temperature in the riser cross-section, substantially instantaneously with well designed and arranged multi-injection nozzles. A feed exit velocity at the nozzles of 10 to 50 feet per second is particularly desired, with the feed nozzles arranged as nearly as possible on the equal area circle of the riser cross-section. Each feed nozzle is preferably steam jacketed to reduce any coking of the hydrocarbon feed within the nozzle. Preferably about 5 weight percent or less steam or other suitable diluent material is also injected into the feed to reduce the equilibrium flash temperature, and to provide the best achievable oil atomizing effect. Typical dispersion steam rates range from 1 to 15 weight percent on feed.

The above identified factors relating to the contacting and mixing of the oil with catalyst are intended to accelerate the mixture relatively uniformly within the vaporization zone in a minimum time frame and thus provide minimum catalyst slippage thus enhancing rapid heat transfer from the hot catalyst to the oil feed and to prevent localized enhanced catalyst to oil ratios. That is, conditions are selected to ensure dilute phase contact between catalyst and oil feed in the vaporization section as opposed to localized dense phase contact.

Typically, a reduced crude feed contains 10 to 12% hydrogen in its molecular structure. The lighter fractions are generally richer in hydrogen than the heavier fractions. Generally the heavier and larger molecular structures are considered hydrogen deficient. The lighter, hydrogen rich fractions are relatively thermostable but are relatively easily catalytically cracked with special catalysts such as zeolite containing catalysts. The heavier hydrogen deficient fractions are thermo-unstable and readily thermocracked on contact with solids at temperatures in the range of from 1000°-1800° F. Indeed the instantaneous and complete vaporization of the heavy fractions, discussed above, encourages simultaneous thermocracking of the high molecular weight components (asphaltenes) leading to the ultimate successful conversion of the total feed to high gasoline yields with low coke make. Achieving complete atomization/vaporization of the heavy components of feed substantially instantaneously upon contact with the catalyst through the mechanisms of high catalyst temperature, low hydrocarbon partial pressure plus the use of multi-nozzled feed injection system to prevent localized bed cracking will encourage the desired thermocracking of the large asphastene type structures. Failure to accomplish the above will lead to the phenomenon of "coke shut-off". This is a phenomenon where heavy hydrogen deficient molecules block the pores of the catalyst rendering the catalyst ineffective in terms of producing high conversions to desired products from either the light or heavy components of the feed.

In the design and operation of a unit of the type described by this invention a basic consideration is that the temperature of catalyst regeneration is unrestrained at least up to a temperature of about 1800° F. While the factors of feed preheat temperature, riser temperature, hydrocarbon partial pressure, and the nature of feed injection and distribution are important, they each have practical limitations and once each is optimized with respect to their practical limitation one must rely upon the fact that the temperature of the regenerator is unrestrained and can be allowed to rise to suit the needs of a particular feed stock to achieve the desired instantaneous vaporization and simultaneous thermocracking of the large, less stable molecular structures.

Table 1 shows the effect on gasoline and coke make when cracking a particular atmospheric resid without a regeneration temperature restraint compared to cracking with the regenerator restrained with respect to temperature. These operations are compared to cracking a gas oil obtained from the same crude oil following vacuum reduction to remove asphaltic type components and cracking the resultant gas oil under prior art conditions.

Table 1 shows that as the regenerator or catalyst temperature is restrained in a resid cracking operation gasoline yield decreases significantly and coke make increases rather correspondingly. It should also be noted that residua can be cracked to higher gasoline yields and at similar coke makes as obtained with a conventional gas oil feed stock.

Table 2 emphasizes the same factors wherein gas oil cracking data is shown compared to 10 volume percent and 20 volume percent vacuum residua added to the same gas oil feed. This tabulation demonstrates that the presence of the residua under optimized conditions results in higher overall conversions, higher gasoline yields and equal if not slightly lower coke makes the conventional gas oil cracking.

TABLE 1

Effect of Restraining Regenerator Temperature and Comparison of Atmospheric Bottoms With Gas Oil Only Feed

|  | Atmospheric Bottoms | | Gas Oil Only |
|---|---|---|---|
| Regenerator Temp: | High | Low | Conventional |
| Gasoline Yield Vo. %: | 67.7 | 63.5 | 61.5 |
| Coke Wt. %: | 5.3 | 8.0 | 6.1 |

TABLE 2

Gas Oil Cracking Present Art Versus Resid Cracking

|  | Gas Oil | Gas Oil + 10% Resid | Gas Oil + 20% Resid |
|---|---|---|---|
| Mild Conversion Operation | | | |
| Conversion Vol. % | 66.0 | 71.0 | 79.0 |
| Gaso. Yield Vol. % | 59.8 | 61.8 | 66.1 |
| Coke Wt. % | 3.0 | 3.6 | 5.6 |
| Optimum Conversion Operation | | | |
| Conversion Vol. % | 76.5 | 77 | 79.5 |
| Gaso. Yield Vo. % | 61.5 | 67.4 | 67.7 |
| Coke Wt. % | 6.1 | 4.3 | 5.3 |

Analyses of the products produced when cracking full atmospheric bottoms compared to gas oils only from the same crude oil show certain other interesting properties;

(1) Liquid products produced have higher average hydrogen contents.
(2) The research octane of the gasolines is significantly higher.
(3) The motor octane of the gasolines is significantly higher resulting in a much improved (R+M)/2 rating important in unleaded gasoline production.
(4) The cracked gas oil products commonly referred to as light and heavy cycle oils and decanted oil are substantially richer in di and tri condensed aromatics in preference to 4, 5 and 6 condensed aromatic rings. The high concentration of two and three member condensed aromatics in the cracked product makes these stocks highly desirable feeds for hydrocracking to gasoline.
(5) The coke produced under optimum operating conditions is very low in hydrogen content. Hydrogen levels in the 3-6 weight percent range are observed versus 8-10 weight percent obtained in prior art gas oil cracking operations. The lower hydrogen level of the coke produced is only explainable by the fact that the operating conditions employed encourages polymerization of polycyclics attracted to the catalyst surface, thereby releasing significant amounts of additional hydrogen for utilization in hydrogen transfer reactions in order to obtain the observed higher hydrogen content of the liquid products. This phenomenon is not observed in the present day gas oil cracking. These reactions are exothermic and hence significantly offset the endothermic heat of reaction of the primary cracking reaction. As a result the overall heat of reaction may be reduced as much as 40 to 50%. This contributes to lower catalyst circulation rates and consequently lower coke makes. The low hydrogen level in the coke is also a major factor of consideration when catalyst regeneration is conducted in the manner embodied in this invention.

A highly siliceous catalyst comprising one of alumina or magnesia with or without a catalytically active crystalline aluminosilicate or crystalline zeolite and of a fluidizable particle size preferably in the range of about 20 to about 200 micron size may vary considerably in cracking activity and levels of metal contaminants accumulated in the cracking operation. If the build up of the metals on the catalyst precludes maintaining a desired conversion level, it is contemplated employing a continuous or semi-continuous catalyst make up and removal or disposal of contaminated catalyst to maintain desired cracking activity aside from regeneration of the catalyst. On the other hand, the catalyst inventory may be substantially completely or partially replaced at turn around conditions or after an extended period of operation as is most convenient to the operation to achieve desired conversion of the feed.

Metals poisoning has long been recognized as a major obstacle to resid cracking. It has been found, however, that these metal contaminants can be passivated to some considerable extent at a high regenerator temperature and their adverse effects markedly reduced when the coke on recycled catalyst is maintained below about 0.05 weight percent. It has been found that about 5% conversion is lost per 0.1 weight percent coke on regenerated catalyst in addition to the expected coke deactivation, because of metals contamination. However, in the reduced crude cracking operation of this invention metals like nickel, vanadium and iron, show som beneficial properties such as activating or enhancing dehydrogenation, hydrogen transfer reaction, and promote CO combustion in the regenerator to achieve a lower coke on recycled catalyst without any need for an outside promoter. On the other hand, sodium and all alkaline metals are still regarded as severe contaminants for particularly a zeolite containing catalyst. Thus, it has been found that feed desalting is a more economical approach to solving the sodium problem than using "soda sink" scavengers. With proper desalting of the feed, sodium therein can be controlled well below 1 PPM.

Catalyst Regeneration

In order to achieve the desired high catalyst temperatures required to properly effect successful cracking of oils comprising residual oils, special regeneration techniques are required along with specially designed and employed apparatus or operating equipment. The high temperature cracking technique of the invention encourages relative high levels of coke or hydrocarbonaceous material to be deposited on the catalyst during its exposure to the oil feed. Levels not normally below 1 weight percent and in some instances over 2 weight percent will occur. It is particularly desirable, however, to regenerate the catalyst to carbon levels below 0.10 weight percent desirably to at least 0.05 and more preferably to about 0.02 weight percent. Regeneration techniques and apparatus or equipment employed in present day cracking of gas oils are unsuitable for achieving the severity of catalyst regeneration required in residual oil cracking for the following reasons:

(1) The high coke levels permitted to build on the catalyst are encouraged by low catalyst circulation rates, that is, by low catalyst to oil ratios. The combination of low catalyst to oil ratios and high carbon levels leads automatically to high regeneration temperatures. Temperatures that are in excess of the normal limits placed upon the stainless steel employed in present day regenerators, in the design of cyclone systems and catalyst withdrawal systems, etc. Also the temperatures contemplated are beyond the current temperature limits of present day power recovery systems of about 1400° F.

(2) The high activity catalysts presently employed in catalytic cracking are not structurally thermostable at the high regenerator temperatures of the invention if this severe regeneration is conducted in a single stage or even in a multi stage regenerator where the multi stages are contained in a single vessel. Two very basic factors effect the catalyst stability during regeneration. At higher and higher coke levels on the spent catalysts, higher and higher catalyst particulate temperatures are developed as the high level of coke is burned in a single vessel even if multi stage single vessel regeneration is employed. These high surface temperatures themselves will render the catalyst ineffective. Secondly, the catalyst deactivates rapidly at high temperatures when the steam formed during coke combustion from associated molecular hydrogen is allowed to remain in contact with the catalyst when the catalyst reaches its highest temperature.

A particular embodiment of this invention is to conduct the regeneration of the spent catalyst in a two vessel system, comprising of two stage sequential catalyst flow system designed and operated in such a particular manner that the prior art catalyst regeneration difficulties are overcome. The catalyst regeneration arrangement of this invention achieves a coke on recycled catalyst level preferably less than 0.02 weight percent without exceeding undesired metallurgical limitation or catalyst thermostability.

The catalytic cracking process of this invention relates to the cracking of high boiling hydrocarbons generally referred to as residua oils and boiling initially at least 400° F. or higher, obtained from crude oil, shale oil and tar sands to produce gasoline, lower and higher boiling hydrocarbon components. The residual oil feed is mixed in a riser reaction zone with a highly active cracking catalyst recovered from a regeneration zone at a temperature preferably above the feed pseudo-critical temperature. The hydrocarbon feed preheated to a temperature below 800° F. is mixed with the very hot regenerated catalyst under conditions to form a generally vaporous hydrocarbon-catalyst suspension. A separation device or arrangement employed at the riser discharge separates from about 70-90% of the catalyst from the vapors. The unique feature of a particular device employed is that it allows higher than usual vapor superficial velocities in the disengaging vessel before the vapors enter the reactor cyclones. Hydrocarbons leaving the reactor cyclones are separated in a downstream fractionation column. The spent catalyst recovered from the riser cracking operation following stripping thereof and at a temperature in the range of about 900° F. to about 1100° F. and deactivated by 1.0 weight percent to 2.5 weight percent of coke, is passed to a temperature restricted dense fluid bed of catalyst in a first stage catalyst regeneration zone.

The regeneration operation to be accomplished in the first stage of regeneration is one of relatively mild temperature sufficient to burn all the hydrogen present in hydrocarbonaceous deposits and from about 10 to 80% of the total carbon therein. The regenerator temperature is restricted to within the range of 1150° F. to 1500° F. and preferably to a temperature which does not exceed the metallurgical limits of the regenerator. Flue gases rich in CO are recovered from the first stage regenerator and may be directed to a CO boiler for more complete combustion therein and/or through a power recovery section prior to a CO boiler. The mild regeneration serves to limit local catalyst hot spots in the presence of steam formed during the hydrogen combustion so that formed steam will not substantially reduce the catalyst activity. A partially regenerated catalyst is recovered from the first regenerator substantially free of hydrogen. The hydrogen freed catalyst comprising residual carbon is passed to a second stage higher temperature regenerator where the remaining carbon is substantially completely burned to $CO_2$ at an elevated temperature within the range of 1400° F. up to 1800° F.

The second stage high temperature regenerator is designed to minimize catalyst inventory and catalyst residence time at the high temperature while promoting a carbon burning rate to achieve a carbon on recycled catalyst less than 0.05 weight percent and more preferably less than 0.02 weight percent.

Traditionally designed regenerators utilized in prior art fluid catalytic cracking have contained various internal components fundamental to the successful operating needs of the process. These include cyclones, usually of several stages, designed to limit process losses of catalyst, catalyst return conduits (diplegs) from the cyclones to the catalyst bed, various support and bracing devices for the above mentioned means. A hopper or similar device plus associated conduits to enable collection and withdrawal of catalyst back to the cracking part of the process. Of necessity, in prior art systems, these various above-mentioned means are of metallic construction, usually stainless steel, and exposed directly to the combustion zone of the regenerator. It is the presence of these means in the combustion zone that limit the maximum temperature that can be supported in the regeneration of catalyst. Generally this leads to a maximum operating temperature of about 1400° F.

The second stage high temperature regenerator embodied in this invention eliminates the above mentioned limitations by locating all devices such as cyclones, diplegs, draw off hopper or well and support systems outside the combustion zone and indeed external to the regenerator itself. The regenerator vessel, void of any internals above the catalyst combustion zone, is refractory lined as are all connecting conduits, external cyclones and diplegs. The design of such a regenerator combination is considered to be an improvement over any known prior art. Regenerated catalyst at a desired elevated temperature is withdrawn from the dense catalyst bed of the second stage regenerator by means of a withdrawal well external to the regenerator vessel. The withdrawn catalyst is charged to the riser reactor at the desired elevated temperature and in an amount sufficient to vaporize the hydrocarbon feed charged according to the operating techniques of this invention. Hot flue gases are fed to external cyclones for recovery of catalyst fines before further utilization as by passing to a waste heat recovery system and then to an expander turbine or discharged to the atmosphere. Due to the fact that the cyclones of the highest temperature regeneration stage are externally located some major and significant advantages aside from those cited above are gained.

Once the cyclone separators are moved from the interior of the catalyst regeneration device to the exterior, it is practical to reduce the diameter of the cyclone device and improve its efficiency in such a way that a single stage cyclone separator means can be used in place of a two stage cyclone means and yet accomplish improved separation efficiency. This is accomplished by use of an obround flue gas transfer pipe including a curved section thereof external to the cyclone but coinciding with the cyclone curvature and tangentially connected to the cyclone. This curved obround transfer means induces an initial centrifugal motion to the hot flue gas catalyst particle suspension thereby encouraging substantially improved cyclone efficiency and enabling a significant reduction in cyclone diameter. In addition, a most significant factor favoring the use of the external cyclone is that the cyclone overall length can be increased as it does not have to fit inside a refractory lined regenerator vessel of limited space and the cyclone separating efficiency is again significantly improved. The net effect of the above two design considerations is that a single stage external cyclone is the operating equivalent of a two-stage internal cyclone system. Externally located refractory lined cyclones can be fabricated of carbon steel even with a regenerator temperature up to 1800° F. Furthermore, the external cyclones can be checked during on stream use with an infrared camera and easily replaced during a shutdown.

The residual oil cracking process of this invention is a breakthrough in conventional FC technology in that it allows one to convert the high boiling residual components and provide the necessary and catalyst temperatures while at the same time providing an environment not appreciably harmful to the catalyst employed in the process. This ultimate high temperature catalyst regeneration operation is required to achieve the substantial instantaneous atomization/vaporization of the residual oil by the catalyst to convert the bottom of a barrel of crude, shale oil, etc., and any related liquid hydrocarbonaceous compound into gasoline. This is a major step toward reducing the dependence of 'free world nations' on imported crude oil.

Additional benefits resulting from the resid cracking process of this invention are a reduction in energy consumption in the overall processing of crude oil, and a reduction in both air and water pollution. Some of these savings are achieved by shutting down vacuum distillation units and/or various thermal processes in some instances. These and other known prior art processes would normally be used to further process atmospheric residua.

Typical energy savings in a crude unit operation by shutting down a vacuum unit is about 0.6 volume percent to 1.0 volume percent on crude charge. Also, air and water pollution frequently associated with the aforementioned deleted process will be eliminated.

A further benefit resides in obtaining a sulphur removal of about 60-70% in the desired resid cracking process. The thus formed $H_2S$ may be removed by amine scrubbing and fed to a claus unit for elemental sulphur recovery and sales as such, as opposed to eventual release as $SO_2$ in combustion processes.

It will be recognized by those skilled in the art that the conversion of residual hydrocarbons may be effected in a number of different apparatus arrangements such as in a riser cracking zone provided with multiple hydrocarbon feed inlet means thereto, in a riser contact zone discharging into a relatively shallow dense fluid catalyst bed to aid separation of hydrocarbon products from catalyst or any other arrangements suitable for the purpose. However, in any of these hydrocarbon conversion arrangements, regeneration of the catalyst used therein is more effectively improved by using the regeneration techniques of this invention. Therefore, the regeneration concepts and operating techniques defined by this invention may be used to considerable advantage in any catalytic cracking operation.

BRIEF DESCRIPTION OF THE DRAWINGS

FIG. I is a diagrammatic sketch in elevation of a side-by-side two-stage catalyst regeneration operation in combination with a riser hydrocarbon conversion operation. A catalyst collecting zone of restricted cylindrical dimension about the riser discharge encompasses rough cut catalyst-vapor separating means expanding generally outward in a vertical and horizontal direction beneath cyclone separating means in an upper portion of the collecting vessel.

FIG. II is a diagrammatic sketch in elevation of a side-by-side catalytic cracking-catalyst regeneration operation embodying a stacked arrangement of two-stage catalyst regeneration wherein large cyclone separators are positioned external to the top second stage of regeneration.

FIG. III is a horizontal cross-sectional view of the rough cut separator means of FIGS. I and II.

FIG. IV is a more detailed sketch of the lower portion of the riser hydrocarbon conversion zone of FIGS. I and II detailing particularly the multiple nozzle feed inlet means.

FIG. V is a diagrammatic sketch of a hydraulic system for controlling the movement of the plug valve 54 of FIG. II.

FIG. VI and VII when viewed together identify a diagrammatic sketch of an improved plug valve assembly or arrangement generally represented by valve 54 of FIG. II.

DISCUSSION OF SPECIFIC EMBODIMENTS

In the processing schemes discussed below, arrangements of apparatus are provided for accomplishing the relatively high temperature catalytic cracking of a residual oil to produce gasoline boiling range material and hydrocarbon materials readily converted into gasoline boiling components and fuel oils. Regeneration of the cracking catalyst so employed is accomplished particularly in a two-stage catalyst regeneration operation maintained under temperature restricted conditions in a first separate regeneration zone to particularly remove hydrogen deposited by hydrocarbonaceous products of the cracking operation. CO formation in the first regeneration zone is not particularly restricted and deactivation of the catalyst by steam formed in the hydrogen burning operation is held to a desired low level. Thereafter, hydrogen-free residual carbon is removed from the partially regenerated catalyst in a second separate relatively dense fluid catalyst system at a more elevated temperature and sufficiently high oxygen concentration restricting the formation of any significant quantity of CO or steam by effecting combustion of residual carbon deposits on the catalyst. The temperature of the second stage catalyst regeneration is allowed to rise sufficiently high to provide a desired oil contact temperature. Generally the temperature range of the regenerated catalyst will be from about 1400° F. up to 1800° F. The regeneration flue gas of the second stage regeneration operation will therefore be substantially CO free if not completely free of CO. Since the flue gas of the second stage regeneration operation will be $CO_2$ rich, such $CO_2$ rich gas may or may not be employed thereafter for steam generation, stripping catalyst between stages of the process and other uses for such gas as desired. The catalyst thus regenerated and comprising a residual carbon on catalyst of less than about 0.20 weight percent and preferably less than 0.05 weight percent is recycled to the cracking operation.

It will be recognized by those skilled in the art that the processing scheme of this invention minimizes high temperature steam deactivation of the catalyst and is an energy conserving arrangement which is particularly desired in this day of energy restrictions. That is, the two stages regeneration operation of this invention reduces the air blower requirement over that of a single stage regeneration operation while accomplishing more complete coke removal. The first stage restricted relatively low temperature regeneration is not restricted to CO formation wherein steam is usually formed and the second stage higher temperature regeneration operation is accomplished in the absence of formed steam and needs to remove only a portion of the total carbon initially deposited on the catalyst. These energy conserving operating conditions are of considerable economic advantage in that a smaller CO boiler for producing process utilized steam can be used since the volume of flue gas from the first stage regeneration system to accomplish a similar desired coke removal. The much higher temperature $CO_2$ flue gas recovered from the separate second stage regeneration operation and absent any significant combustion supporting level of CO may be cooled through a device or heat exchange means generating additional steam.

The processing arrangement of the invention provides a further energy conservation in that by charging atmospheric residual oil feed to the cracking operation, energy intensive vacuum distillation and other forms of feed preparation requiring significant energy are eliminated. Steam generated as above identified and/or process normally gaseous hydrocarbons may be used with the feed as a diluent to improve atomization of the feed upon contact with the hot regenerated catalyst. The catalyst charged to the cracking operation will be at a higher temperature than is normally obtained in the prior art single stage temperature limited regeneration operation and is obtained without steam and thermal damage to the catalyst. In addition the regeneration sequence of the invention more economically contributes more heat to the desired vaporization and endothermic conversion of the residual oil hydrocarbon charge as herein provided. Further energy conservation advantages are achieved by virtue of the fact that a residual oil comprising distress components of the crude oil are processed to more desirable products including gasoline through the elimination of satellite high energy consuming operations, such as vacuum distillation, propane deasphalting, visbreaking, delayed coking, hydrogen enriching operations and combinations thereof as employed heretofore in the petroleum refining industry.

The processing combinations of the present invention contemplate replacing catalyst circulated in the system with catalyst particles of a lower metals loading, or content, obtained for example as fresh catalyst or equilibrium catalyst from other cracking operation. Thus, a portion of the catalyst particles separated in the first stage regeneration operation or the second stage regeneration operation or both as normal catalyst loss may be replaced with fresh catalyst or catalyst particles of suitable cracking activity and comprising lower levels of metal contaminants.

The operating concepts of the present invention are useful in designing grass roots systems and adaptable to many different refining operations now in existance and comprising a single regeneration operation in combination with a hydrocarbon conversion operation such as riser cracking or a dense fluid bed cracking operation. In any of these operations it is intended that the regeneration temperature necessarily be restricted to a low temperature first stage and a second higher temperature separate regeneration operation in order to achieve the advantages of the present invention particularly with respect to energy conservation and eliminating high temperature damage to the cracking catalyst in the presence of formed steam.

It is immediately clear that the regenerating processing concepts of this invention lend themselves to improving substantially any hydrocarbon conversion process whether or not the hydrocarbon charged to the cracking operation comprises distress asphaltic components and metal contaminants or is merely a high coke producing charge material relatively free of significant amount of metal contaminants and/or asphaltenes. However, as provided herein, the advantages of the processing innovation of this invention substantially improve as satellite treatment of the crude hydrocarbon charge to remove these materials is reduced.

It will be further recognized by those skilled in the prior art, that existing temperature restricted catalytic cracking and regeneration apparatus may be modernized to achieve the higher temperature operations of this invention with a minimum capital expenditure and downtime whether or not one is modernizing a stacked single stage reactor regenerator arrangement, a side-by-side single stage reactor regenerator arrangement or one of the more modern units comprising a riser reactor hydrocarbon conversion zone in combination with a dense catalyst bed in open communication with an upper riser catalyst regeneration operation.

Referring now to FIG. I by way of example, spent catalyst received from a residual oil hydrocarbon conversion operation and comprising hydrocarbonaceous deposits is passed by conduit 1 into a dense fluid bed of catalyst 3 housed in regeneration vessel 5. Regeneration vessel 5 is considered a relatively low temperature regeneration vessel wherein the temperature is maintained generally below 1500° F. and the concentration of oxygen charged by regeneration gas in conduit 7 and distributor 9 is restricted to limit regeneration temperature as desired during burning particularly of hydrogen associated with hydrocarbonaceous deposits. Carbon burning is also partially accomplished in the operation as above identified under conditions to form a CO rich regeneration flue gas. The flue gas thus generated is passed through cyclone separators means represented by separators 11 and 13 before withdrawal by conduit 15. Catalyst thus separated from flue gas by cyclones is returned to the catalyst bed by appropriate diplegs. In vessel 5, it is particularly intended that the catalyst is only partially regenerated so that some residual carbon remains on the catalyst for more complete removal at temperatures above 1500° F.

In the arrangement of the drawing, the first stage of catalyst regenerations accomplished in vessel 5 is a relatively low temperature operation designed to produce a CO rich product gas. Partially regenerated catalyst is withdrawn from the catalyst bed by withdrawal conduit means 17 for passage to an adjacent vessel 19. A downflowing relatively dense mass of catalyst is caused to flow through vessel 19 counter current to aerating and stripping gas introduced by conduit 21. The aerating gas is preferably one which will be relatively inert at least with respect to deactivating the partially regenerated catalyst and preferably is one which will considerably restrict the transfer of moisture formed components with the catalyst to a second stage of catalyst regeneration effected at a temperature above 1500° F. Aerating gases suitable for use in zone 19 include $CO_2$, flue gas substantially moisture-free, nitrogen, dry air and combinations thereof.

The partially regenerated catalyst is withdrawn from vessel 19 by a stand pipe 23 communicating with catalyst transfer conduit 25 and riser conduit 27. Gas such as air, nitrogen, $CO_2$ and mixtures thereof may be added to assist with transporting the catalyst by gas inlet conduits 29 and 31. A plurality of gas inlet conduits represented by conduit 29 may be employed in the conduit bend between conduits 23 and 25 and downstream thereof in the transport conduit to aid transport of catalyst therethrough. Regeneration gas such as air or an oxygen enriched gas stream is introduced by conduit 31 for contact with partially regenerated catalyst in riser conduit 27. Conduit 27 discharges into a bed of catalyst 33 maintained in the lower portion of a relatively large diameter regeneration zone or vessel 35. Additional regeneration gas such as air is introduced to a lower portion of catalyst bed 33 by conduit 37 communicating with air distributing means suitable for the high temperature operation to be encountered.

In the second stage regeneration operation effected in regenerator 35, the temperature is within the range of 1400° F. to 1800° F. and sufficiently higher than the first stage of regeneration to accomplish substantially complete removal of residual carbon not removed in the first stage. Regenerator vessel 35 is a refractory lined vessel substantially free of metal exposed internals and cyclones so that the high temperature regeneration desired may be effected. In this high temperature operation, residual carbon on catalyst is preferably reduced below 0.05 weight percent and a high temperature $CO_2$ flue gas stream is recovered by external cyclone separators. Preferably relatively large single stage cyclone separators are used which are refractory lined vessels. That is external plenum section 39 is provided with radiating arms from which cyclone separators are hung or arranged as graphically shown in the drawing by arms 41 and 43 and connected to cyclones 45 and 47 respectively. On the other hand, the cyclone arrangement of FIG. II discussed below may be employed with regenerator 35. Catalyst thus separated from flue gas at elevated temperatures up to 1800° F. is returned by diplegs provided. A high temperature $CO_2$ rich flue gas is recovered separately from each cyclone separator for further use as desired or as a combined hot flue gas stream 49 for generating steam in equipment not shown. It will be recognized by those skilled in the art that more than one cycle separator may be used together in sequence and the number of cyclones in the sequence will be determined by the size of each and the arrangement employed.

The catalyst regenerated in the second stage of regeneration and heated to a temperature above the first stage regeneration temperature by burning residual carbon to a level below 0.10 weight percent and is preferably below 0.05 weight percent is withdrawn from bed 38 by conduit 51 and passed to an adjacent vessel 53. The withdrawn catalyst is aerated preferably by a moisture free gas introduced by conduit 55 or at least one substantially moisture free in the adjacent catalyst collecting zone or vessel 53. Aerating gas is withdrawn by conduit 57 and passed to the upper portion of vessel 35.

Hot regenerated catalyst at a temperature above 1500° F. is withdrawn from zone 53 by a standpipe 59 comprising flow control valve 61. The hot catalyst then passes by transport conduit 63 to the lower bottom portion 65 of a riser hydrocarbon conversion zone 67. Aerating or lift gas, such as light hydrocarbons recovered from a downstream light ends recovery operation not shown or other suitable fluidizing gaseous material is charged beneath the catalyst inlet to the riser by conduit 60.

In the hydrocarbon conversion operation particularly contemplated, the hot catalyst of low residual carbon is caused to flow upwardly and become commingled with a multiplicity of hydrocarbon streams in the riser cross-section charged through a plurality of curved feed nozzles 71 arranged adjacent to but spaced inwardly from the riser refractory lined wall section. More particularly the riser wall is provided with a half ring donut shape or other shape bustle wall section 73 through which the plurality of annularly spaced feed nozzles pass upwardly and inwardly through. A diluent gas such as steam, light hydrocarbons or a mixture thereof may be added with the residual oil charged to enhance its dispersion and vaporized commingling with the very hot catalyst particles. The riser section adjacent to the outlet of the feed injection nozzles is preferably expanded to a larger diameter riser vessel through which vaporized oil and catalyst pass. To further assist with obtaining desired commingling and substantially instantaneous vaporization of the charged residual oil components, a number of small oil streams are admixed with hot catalyst. The vaporized hydrocarbon material comprising products of cracking and suspended particles of catalyst pass upwardly through the riser 67 for discharge from the upper end of the riser through suspension separator means or device discussed below.

The initial suspension separator referred to as a rough cut separator at the end of the hydrocarbon conversion zone is an outwardly expanding appendage from the riser resembling butterfly-shaped wing appendages in association with relatively large openings in the wall of the riser adjacent and capped upper end thereof. That is, the rough cut separator at the riser end viewed from the side FIG. I and top FIG. III resembles a butterfly-shaped device. The appendages are open in the bottom to the surrounding vessel for discharging hydrocarbon vapor substantially separately from catalyst particles. The sides 77, FIG. III, are solid substantially vertical panels and the ends 79 are solid substantially vertical curved panels. The top of each appendage is capped by a sloping roof 81, FIG. I, peaked in the center to minimize the hold-up of catalyst and coke particles thereon. The slope of the roof panel is preferably at least equal to the angle of repose of the catalyst and more preferably greater to avoid catalyst holdup on the appendage roof. Other arrangements known in the prior art permitting high vapor discharge velocities may be employed for initial separation of the hydrocarbon vapor—catalyst suspension discharged from the riser upper end. In operation, the vaporous materials comprising hydrocarbons and diluent in admixture with suspended catalyst is discharged through openings 75 in the riser and expanded within each appendage chambers A and B to reduce the velocity of the mixture and concentrate catalyst particles separated from vaporous material along the outside vertical curved wall 79 of each appendage. The catalyst particles thus concentrated or separated, fall down the wall and are collected as a bed of catalyst 83. Vaporous materials separated from particles of catalyst pass downwardly through the open bottom side of each appendage adjacent to riser wall and thence upwardly into one or more, such as, a sequence of cyclone separators represented by separator 85 in the upper portion of vessel 87 above the top of the riser. Hydrocarbon vapors and other gasiform material separated from catalyst is withdrawn by conduit 89 for passage to product recovery equipment not shown. Catalyst separated in the one or more cyclones is passed by diplegs provided to catalyst bed 83. Stripping gas such as steam, is charged to bed 83 by conduit 91. Stripped hydrocarbons pass with product hydrocarbon vapors leaving the rough cut separator and enter the cyclone separator arrangement. The stripped catalyst comprising hydrocarbonaceous product of residual oil cracking and metal contaminants is withdrawn by conduit 93 comprising valve 95 and thence is passed by conduit 1 to the first regeneration stage.

Referring now to FIG. II there is shown an arrangement of apparatus differing from the apparatus arrangement of FIG. I in that the separate regeneration vessels 2 and 4 are stacked one above the other on a common axis with the highest temperature regenerator 4 being the top vessel. In addition the hot flue gases are withdrawn from regenerator 4 through refractory lined piping 6 and 8 arranged to resemble a "T" with a large cyclone separator 10 in open communication with and hung from each horizontal arm 8 of the "T" pipe section. In this apparatus arrangement, the hydrocarbon conversion riser reactor 12 with multiple feed inlet represented by means 14 and suspension rough cut separating means 16 are shown the same as discussed with respect to FIG. I. However, it is contemplated using this system or other arrangements in combination with one or two large cyclone separators 18 in an upper portion of the catalyst collecting vessel 20 above the riser discharge or external to the collecting vessel in an arrangement resembling that shown on the upper regenerator 4 of the apparatus.

In this apparatus arrangement of FIG. II, hot regenerated catalyst at a temperature above 1400° F. in conduit 22 is charged to the base of riser 12 where it is commingled with lift or aerating gas introduced by conduit 24. Catalyst thus aerated is thereafter caused to be contacted by a plurality of nozzle means 14. In a particular embodiment there are 6 spaced nozzle or pipe means FIG. IV extending through the riser wall in the manner shown. Steam may be injected with the feed for dispersion purposes as discussed above.

A hydrocarbon vaporous-catalyst suspension passes upwardly through riser 12 for discharge through rough cut appendages 16 in a manner as discussed with respect to FIG. I. Hydrocarbon vapors separated from catalyst particles pass through one or more cyclone separators 18 for additional recovery of catalyst before passing the hydrocarbon containing vaporous material by conduit 26 to a product fractionation step not shown.

Catalyst separated by means 16 and cyclone 18 is collected as a bed of catalyst in a lower portion of vessel 20. Stripping gas, such as steam, is introduced to the lower bottom portion of the bed by conduit 28. Stripped catalyst is passed by conduit 30 with valve 72 to a bed of catalyst 32 being regenerated in vessel 2. Regeneration gas, such as air, is introduced to a bottom portion of bed 32 by conduit means 34 communicating with air distributor string 36. Regeneration zone 2 is maintained as a relatively low temperature regeneration operation below 1500° F. and under conditions selected to achieve a partial removal of carbon deposits and all of the hydrogen associated with deposited hydrocarbohaceous material of cracking. In this operation a CO rich flue gas is formed which is separated from entrained catalyst fines by one or more cyclones, such as cyclones 38 and 40, in parallel or sequential arrangement with another cyclone. CO rich flue gases are recovered from the cyclone separating means by conduit 42.

Partially regenerated catalyst is withdrawn from a lower portion of bed 32 for transfer upwardly through riser 44 for discharge into the lower portion of a dense fluid bed of catalyst 46 having an upper interface 48. Regeneration gas, such as air or oxygen enriched gas, is charged to the bottom inlet or riser 44 by a hollow stem plug valve 54 comprising slow control means 74. Additional regeneration gas, such as air or oxygen enriched gas, is charged to bed 46 by conduit 50 communicating with air distributor ring 52. Regeneration vessel 4 is a refractory lined vessel freed of metal appendage so that the temperature therein is not restricted and may be allowed to exceed 1500° F. and go up to as high as 1800° F. In this catalyst regeneration environment, residual carbon remaining on the catalyst following the first regeneration stage is substantially completely removed in the second stage. Thus the temperature in regenerator 4 is not particularly restricted and sufficient oxygen is charged to produce a $CO_2$ rich flue gas absent combustion supporting amounts of CO by burning the residual carbon on the catalyst. The $CO_2$ rich flue gas thus generated passes with some entrained catalyst particles from the dense catalyst bed 46 into a dispersed catalyst phase thereabove for withdrawal by conduits 6 and 8 communicating with cyclone 10. Conduit means 8 is preferably horizontally curved prior to tangential communication with cyclone 10. The curvature of conduit 8 is commensurate in part with the curvature of the cyclone wall so that an initial centrifugal separation of entrained catalyst particles is effected in conduit 8 and prior to entering the cyclone separator. Catalyst particles are separated from the hot flue gases with a high degree of efficiency by this arrangement and the efficiency of the cyclone separating means can be more optimized by lengthening the conical bottom of the cyclone. Catalyst particles thus separated are passed by refractory lined leg means 56 to the bed of catalyst 46 in the high temperature regenerator. $CO_2$ rich flue gases are recovered by conduit 58 from cyclone 10 for use as herein described. Catalyst particles regenerated in zone or vessel 4 at a high temperature up to 1800° F. are withdrawn by refractory lined conduit 60 for passage to vessel 62 and thence by conduit 64 provided with valve 66 to conduit 22 communicating with the riser reactor 12 as above discussed. Aerating gas is introduced to a lower portion of vessel 62 by conduit means 68 communicating with a distributor ring within the vessel 62. Gaseous material withdrawn from the top of vessel 62 by conduit 70 passes into the upper dispersed catalyst phase of vessel 4.

The apparatus arrangement of FIG. II is a compact side-by-side system arranged in pressure balance to achieve desired circulation of catalyst particles and the processing conditions particularly desired as herein discussed. The operation of the system is enhanced by the use of spheroidal shaped particles of catalyst less than 200 microns and providing an average particle size of at least 70 microns. It is contemplated modifying the system of FIG. II by providing relatively large external cyclones on vessel 20 about the upper end of the hydrocarbon riser conversion zone. That is, external cyclone separating means arranged similarly to that associated with conduits 6 and 8 and cyclone 10 may be attached to a shortened vessel 20 and used in place of internal cyclone 18. Catalyst particles thus separated would be conveyed by suitable diplegs to the bed of collected particles in the lower portion of vessel 20 being contacted with stripping gas introduced by conduit 28.

Referring now to FIG. IV by way of example, there is shown in greater detail the arrangement of apparatus contemplated for separately charging hot regenerated catalyst and feed to a lower portion of the hydrocarbon conversion riser zone 65 of FIG. I or riser 12 of FIG. II. The residual oil is fed through a plurality of curved tubes 71 jacketed in a steam conveying tube 10. In the arrangement of FIG. IV, hot catalyst at an elevated temperature above identified and above 1400° F. is charged by refractory lined conduit 63 to a bottom portion 65 of the riser hydrocarbon conversion conduit 67 each being lined with refractory material. Catalyst aerating or fluidizing gas is charged by conduit 69 to a distributor in the bottom portion of the riser. A very hot suspension of catalyst and lift gas is formed which thereafter passes upwardly through the riser for contact with a residual oil feed charged by a plurality of steam jacketed feed inlet pipes 71. The oil feed charged by means 71 is mixed with a diluent such as steam or light hydrocarbons charged by conduit 109, thereby reducing the partial pressure of charged hydrocarbon feed. Jacket steam for the oil feed nozzle is charged to an annular section about pipe 71 by steam inlet means 111. A plurality of such jacketed nozzles are provided which discharge in the cross-section of the riser and preferably there are six such nozzles to achieve the high temperature contact between catalyst particles and oil charged to achieve substantially instantaneous vaporization-atomization of the residual oil feed. The nozzle arrangement passes through a bustle section 73 viewed as a donut-shaped half pipe section in the riser wall which is filled with refractory material. The nozzles thus provide discharge in an equal area diameter portion of the riser cross section so as to improve intimate atomization-vaporization contact with the suspended catalyst particles passing up the riser. The plurality of oil feed pipe outlets are preferably arranged in a circle and spaced from the riser wall within the riser cross-section to achieve desired mixing of oil feed with the hot catalyst particles sufficient to achieve substantially instantaneous vaporization of the charged residual oil. It is recognized that various techniques known in the prior art comprising atomizing nozzles may also be employed to assure substantial atomization of the charged oil for more intimate vaporizing contact with the hot catalyst particles at a temperature within the range of 1500° F. to 1800° F.

The residual oil cracking operation of this invention relies upon the very high temperature catalyst regeneration operation for providing a catalyst of very low residual carbon at a temperature exceeding the pseudo-critical temperature of the feed charged in order to achieve substantially instantaneous vaporization of the charged oil feed. Another important aspect of the combination operation is to sustain catalyst activity by replacing some metals contaminated catalyst with fresh catalyst and effecting an initial regeneration of the catalyst under limited temperature conditions minimizing steam deactivation of catalyst particles during regeneration. The cracking operation of the invention is essentially a once through hydrocarbon feed operation in that there is no recycle of heavy hydrocarbon product to the cracking operation. On the other hand, light normally gaseous hydrocarbon product, process generated steam and $CO_2$ may be recycled and used as above provided. It is further contemplated alkylating formed olefin components suitable for the purpose in downstream equipment not shown and hydrocracking formed hydrocarbon product material boiling above gasoline to produce additional gasoline and/or light oil product. The hydrocarbon product boiling above gasoline may be hydrogenated to remove sulphur and nitrogen to produce acceptable fuel oil material.

The catalytic cracking-catalyst regeneration concepts above discussed are addressed particularly to achieving a high degree of product selectivity in the catalytic conversion of high boiling hydrocarbons, particularly residual oils, in the production of cracked gasoline, gasoline precursors and catalytic cycle oils.

The processing concepts hereinafter discussed are more particularly directed to achieving a high degree of product selectivity in the cracking operations above discussed by paying more particular attention to a fifth operating variable. This fifth operating variable is particularly concerned with heavy oil feed atomization and the nozzle injection system more suitable for the intended purpose.

In this operating concept it is particularly desired to achieve at the point of contact of a highly atomized oil feed with fluidized catalyst particles to achieve substantially instantaneous vaporization-pyrolytic catalyst conversion of atomized oil droplets contributing to a sharp increase in a formed hydrocarbon vapor-catalyst suspension velocity upwardly through the riser and providing a catalyst concentration in the suspension of less than about 5 pounds per cubic foot. Thus the more rapid instantaneous vaporization and conversion of the oil feed is achieved the less of a pressure drop is experienced adjacent the atomized feed contact with upflowing catalyst particles.

It is observed when operating as herein disclosed that the product selectivity of the converted residual oil by thermal and catalytic means may be varied considerably depending upon the degree of heavy oil feed atomization brought in contact with high temperature catalyst particles to achieve vaporization of the charged oil feed. The fifth operating variable is thus concerned with identification of a nozzle fed inlet means and utilization thereof for obtaining a high degree of residual oil feed atomization and discharged at a more elevated velocity to assure rapid vaporization upon discharge into a upflowing suspension of hot catalyst particles suitable for the purpose. Thermal and catalytic conversion of the vaporized oil feed to desired products is thus achieved in a very short time frame concomminitely with reducing the temperature of a formed suspension as herein discussed. In this preferred operating environment, a highly atomized oil feed charged to the riser cracking zone at a velocity above 300 ft./second up to 1300 ft./second (fps) and dispersed in a fan-shaped pattern of 15 degrees in one direction aby about 90 to 120 degrees in another generally horizontal direction to the riser cross-section for intimate contact with an upflowing suspension of hot catalyst particles of a particle concentration density from about 16 to 35 lbs./cu. ft. is substantially immediately velocity dissipated to form an upflow hydrocarbon vapor-catalyst particle dispersed phase suspension. The rapidity with which this is achieved minimizes the pressure drop encountered in the formation of a relatively high velocity suspension of product vapors and catalyst discharged from the riser at a velocity in the range of 90 to 120 ft./second. The catalyst concentration in the suspension thus formed will usually be less than 5 pounds per cubic foot and may be as low as 1 pound per cubic foot at the riser outlet.

In achieving substantially instantaneous vaporization of oil droplet, thermal and catalytic conversion thereof in a short vertical space of the riser as herein perceived and measured as a small pressure drop in a vertical portion of the riser above the feed inlet of about 5 feet or less. The formed suspension temperature rapidly drops or is reduced to a level within the range of 935° to 1000° F. as measured at the riser outlet. In conjunction with achieving instantaneous vaporization of the atomized oil feed, up to about 50% thermal conversion of the atomized oil feed occurs along with catalytic conversion thereof to form high yields of gasoline and cycle oils. The combination appears to occur in the riser in a very short time frame less than about 2.5 seconds and substantially complete conversion is believed to occur in less than about 1.5 seconds in view of the high yield of gasoline and cycle oil products and in view of the low pressure drop within the riser reactor above the atomized feed inlet point above identified.

It is further observed in developing the residual oil conversion concepts herein expressed that atomizing the oil to a droplet size commensurate with or smaller than the used fluid catalyst particle size and comprising an average particle size within the range of about 70 to about 100 microns also contributes to rapid vaporization at relatively high velocity to the low pressure drop in the riser reactor as herein discussed. It is further observed when comparing two different riser catalytic conversion operations employing considerable variation in feed atomization and hydrocarbon contact time with catalyst particles in the riser reactor, that in a first system graphically represented in FIG. V and comprising relatively poor residual oil feed atomization conditions results in reduced catalytic conversion contributing to poor product selectivity even though thermal conversion of at least about 50% is achieved when compared with a second system providing a more highly atomized and vapor distributed residual oil feed for intimate admixture with high temperature catalyst particles sufficient to form a dispersed phase suspension therewith. It is graphically shown in FIG. V that this second system of similar thermal conversion at zero function of surface area times C/O ratio activity, provides higher overall conversion attributed to catalytic conversion of highly atomized-vaporized hydrocarbons. That is when defininng catalyst activity as a function of catalyst surface area times the catalyst to oil ratio, the second system consistently provides higher levels of conversion with a highly atomized feed as graphically shown. In this hydrocarbon conversion environment, it is preferred that the catalyst average surface area be retained at a level of at least 40 sq. m/g by replacement with higher surface area catalysts and it may be retained at a higher level up to about 80 or 100 sq. m/g depending on catalyst replacement economics.

It is further observed when comparing the system represented by the graph of FIG. V that the second system achieved a higher conversion level at substantially the same coke make as the first system even though a longer hydrocarbon residence time up to about one second is employed in the riser of the second system over that employed in the first system.

The exact mechanism by which improved conversion and thus product selectivity and yield is achieved by system 2 over system 1 above identified is not completely identifiable except to say that the more highly atomized the oil feed and distributed in a generally horizontal pattern across the riser cross-section by the nozzle means of FIG. VI accomplishes very rapid vaporization of the fine oil droplets for vaporized conact with fluid catalyst particles at a temperature equal to or above the pseudo-critical temperature of the atomized residual oil feed It is observed further that when discharging high velocity oil droplets at 1300 ft./second into the riser reactor that the high droplet velocity dissipates rapidly to about 630 ft./second about one inch above the nozzle tip of FIG. VI and down to about 350 ft./second in about 2 inches from the nozzles slotted discharge orifice. At 6 inches from the nozzle discharge the velocity is only about 130 ft./second.

It thus appears in the relatively severe residual oil-catalyst contact environment of system 2 that oil droplets smaller than the catalyst 100 micron average particles size and uniformly dispersed therewith at the feed pseudo-critical temperature will be substantially completely vaporized in less than a fraction of a second if not thermally and catalytically converted substantially. It thus becomes further readily apparent that such conditions with provided catalyst has a decidedly improved effect on conversion and selectivity of product achieved.

Referring now to FIG. VI, the improved nozzle feed inlet system associated with the improved results obtained in the discussion of FIG. V is shown. Riser section 80 corresponds to either riser 67 of FIG. I or riser 12 of FIG. II. The riser may be a straight cylindrical pipe above the feed inlet nozzle as shown or it may be tapered to be slightly expanding to the riser outlet or slightly diverging to be of smaller diameter at the riser outlet than the diameter at the feed inlet nozzle so that a formed vapor-catalyst suspension will be rapidly accelerated to a suspension dissipating means at the riser outlet.

In the arrangement of FIG. VI, the riser bottom section 82 is of smaller diameter than the upper portion thereof and connected by transition section 84. Fluid catalyst particles are charged to the lower bottom portion of the riser by conduit 86. Fluidizing gas is charged to the riser beneath the catalyst inlet conduit 86 by conduit 88 communicating with a distributing ring within the riser cross-section. Conduit 90 provided with valve 92 permits withdrawing catalyst from the bottom of the riser. The fluidizing gas charged by conduit 88 may be gaseous products of catalytic cracking from which gasoline precursors are separated or steam may be employed. It is preferred that a fluidizing gas other than steam be employed as a transition medium for effecting smooth fluid upflow of hot catalyst as a suspension in the bottom portion of the riser up to the feed nozzle outlet. Instrument taps may be provided in the riser wall and particularly above transition section 84 for determining pressure drop of the operating system and temperature profile thereof.

The feed injection nozzle comprises a barrel 94 with slotted end opening 96 housed in a cylindrical heat dissipating shroud 98. The nozzle passes through the riser wall above the transition section at an angle of about 30 degrees in this specific embodiment. The oil feed to the process is charged to the nozzle with or without a dilent material to reduce the partial pressure and/or viscosity thereof by conduit 100 in communication with orifice opening 102 so that the charged heavy oil will impinge upon flat surface 104 to form droplets which are sheared to a finer droplet size by high velocity gaseous material charged by conduit 106 communicating with orifice restriction 108. The atomized heavy oil feed of desired droplet size above identified and formed innterior to the riser passes through the barrel of the nozzle at high velocity and discharge by slotted opening 96 producing, fan-shaped pattern of atomized oil droplets in the riser cross-section. It is preferred that there are two or more such nozzle arrangements provided and equally spaced horizontally around the riser periphery from one another. It is also contemplated vertically staggering 2 or more of the nozzle arrangements discussed in a restricted vertical space of the riser reactor less than about five feet to provide highly turbulent intimate contact of highly atomized feed with upflowing particles of catalyst of desired elevated temperature above discussed.

It is further contemplated providing the nozzle atomized heavy oil feed inlet means higher up on the riser reactor wall than shown so that less than about ten feet of the riser length beneath the outlet thereof will house the hydrocarbon vapor-catalyst suspension formed as herein discussed.

The present invention is particularly concerned with controlling the flow of solid particulate from one zone to another zone. More particularly the invention is concerned with the method and means for controlling the flow of finely divided fluidizable solid particulate material from one zone to another in response to preselected process restrictions by the use a plug valve assembly positioned in a solids transfer conduit connecting the separate zones. In a more particular, aspect the present invention is concerned with the method and means for controlling the flow of finely divided catalyst particles of fluidizable particle size from elevated temperature zone to another in response to positioning of the plug valve which is employed in the inlet of a transfer conduit such as a riser or standpipe suitable for the purpose and employed between zones.

The method and means of the present invention is concerned in one particular embodiment with the transfer of hot finely divided fluidizable catalyst particles from a first catalyst regeneration zone to a second separate catalyst regeneration zone wherein a transfer conduit between zones is controlled with respect to the flow of solids passed therethrough by a hollow stem plug valve position in the inlet end to the transfer conduit. In a particular embodiment the transfer conduit is a substantially vertical riser conduit means in an initial portion thereof adjacent the solids inlet thereto, to which a substantially vertical plug valve system or assembly is functionally related to monitor and control selected flow rates of solid particulate material as herein more specifically described.

In the method and system of catalyst regeneration comprising this invention, the separate catalyst regeneration zones are positioned one above the other such as in a stacked arrangement, in which system it is desired to pass partially regenerated catalyst from the lowermost zone to the uppermost catalyst regeneration zone by a riser conduit means. The flow of solids through the riser conduit or solids transfer conduit is preferably controlled by a hollow stem plug valve of conical end structure sloped within restricted limits to optimize particle flow and for obtaining matching inlet relationship with the bottom open end of the riser conduit provided with a sloping internal surface or face portion thereof generally coinciding with the slope of the conical portion of the plug valve. The flow of solids through the riser conduit is limited in partially closed position by the annular space provided between the surface of the plug valve and the inlet to the riser with this annular space varied by vertical movement of the plug valve under controlled positioning as herein identified.

In fluid catalyst particle regeneration systems comprising two separate regeneration zones with a transfer conduit between zones, it is not unusual to experience variations in elongation of the catalyst transfer conduit due to changes in regeneration temperatures to which exposed and particularly high temperature catalyst regeneration as well as during the period of start up and on stream operation conditions. Thus, it is not unusual to experience a variation in riser vertical length in the range of a fraction of an inch up to several inches comprising about eight or ten inches. This encountered substantial thermally imposed variation in transfer conduit length necessarily requires that the plug valve system be of a design which permits a vertical travel commensurate with encountered thermal variation of the riser length so that undesired closed pressure variation attributed to thermal deviation between matching surfaces of plug valve and riser inlet opening will not exceed a predetermined closed pressure value and yet maintain a desired open setting during flow control vertical operation between closed position and the selected open position.

The present invention is particularly concerned with plug valve design as well as the method and system for maintaining desired restrictions between the face of the plug valve and the inlet surface of the riser conduit during startup of the operation and heatup of the regeneration system as well as rapidly compensating for flow control changes in response to process selected operating parameters during a particular open setting as the riser conduit encounters some changes in length due to temperature change encountered during on stream operation. The control system and method of operation herein particularly identified and described is applicable for use with hollow stem plug valves as well as solid stem plug valves used to control the flow of fluidizable material through riser and standpipe transfer conduit means. The plug valve system with the identified method of control is preferably employed in a generally vertical arrangement to maintain desired fluid particle flow into or from conduit or vessel means provided for the purpose.

In the diagrammatic arrangement of FIG. V there is provided a hydraulic control scheme associated with a system actuator designed to provide a continuously modulated positioning or control over the plug valve with respect to closure pressure and in response to process induced control signals. Thus the system actuator control is designed to operate as a fixed force device particularly during startup and shutdown which compensates for pressure variations between plug valve and riser inlet due to thermal variations in the regeneration system in which employed and particularly a riser zone in a regeneration zone.

In the control system of FIG. V, the system pressure is kept constant by a variable displacement pump 80 driven by an electrical motor (M). The pump is enclosed within a reservoir 82. When there is no movement of cylinder rod (C1) attached to the plug valve 54 of FIG. II required, the pump 80 displaces only the fluid volume in the reservoir required to maintain system pressure. This reduces generated heat and allows the driving motor to operate near its no-load current level. The pressured fluid passes from pump 80 by conduit 84 to a filter and thence to the hydraulic power accumulators A1-3, solenoid valves and servo valves as discussed below. A hand pump P2 and related system provides on the extreme right of the drawing provides for manual operation when pump 80 is shut down. This manual subsystem also comprises a small reservoir (R2) for make up fluid, directional fluid flow control valve (MV1) for directing fluid to either side of the piston in cylinder (C1) as desired. Manual liquid flow control valves (MV2) and (MV3) isolate this manual subsystem from the primary control system discussed below during normal operation.

Modulating control of the primary system is accomplished as follows. In the arrangement of FIG. V, a process selected electric input signal provided by box 86 in response to a predetermined and programed process operating conditions is transmitted to the main servo flow control valve (SV1). During normal modulating control service, solenoid valve (SOL2) is de-energized causing the pilot operated check valve (CV3) to open permitting full pressure flow of fluid to valve (SV1) which allows the system to operate in response to signaled servo valve (SV1) in a normal manner. Valve (SOL2) also directs the pilot back pressure to valves (CV8) and (CV9) which closes these valves during modulating control operation. Closing valve (CV8) keeps hydraulic fluid pressure off reducing valve (PRV1) and closing valve (CV9) prevents return fluid flow from the cylinder through that channel. When solenoid (SOL1) is energized it directs pilot pressure to check valves (CV4) and (CV5) connected between servo (SV1) and the cylinder (c1). Valves CV4 and CV5 are normally held open by the system pressure. However, when the system pressure is lost for any reason, they close and prevent the piston in (C1) from moving except by using the manual operation.

The servo valve (SV1) is electrically controlled in response to electric input signals generated by process demand signals from box 86 to direct hydraulic pressure fluid to either end of the cylinder (CV1). By proper positioning of valve SV1, fluid may be returned from either side of the cylinder (C1) through conduit means communicating with check valve (CV1) in the reservoir. The reservoir is provided with a heater controlled by temperature switches TS1 and TS2, a fluid level control switch FS1 and pressure-vacuum relief valve arrangement RV1. The reservoir is pressure managed within the range of about −0.3 psig up to about 5 psig by valve system RV1.

When operating the system in a pressure controlled mode by pressure switch (PS1) the following occurs. Solenoid (SOL2) is energized and removes the flow of pilot pressurized fluid to (CV3) allowing (CV3) to close which then blocks pressure flow of fluid to (SV1). In the system herein discussed, the pilot or back pressure causes the ball to move off the seat thus allowing pressured flow of fluid through the valve. However, when this pilot pressure is removed, the ball moves to the valve seat and prevents fluid flow through the pressure modulated valve. Thus when (SOL2) is de-energized, removing the pilot pressure from valves CV4 and CV5, these check valves become closed and prevent the flow of pressured fluid therethrough. In the system herein discussed, the pilot pressure is selected to be about ⅓ of the system total pressure. Other pilot pressures may be selected for use with the system as required for a given plug valve operation. That is, a pilot pressure within the range of ¼ to ½ of the system pressure may be utilized depending upon application of the pressure control system.

In this pressure control operation embodiment, the pilot pressure may also be removed from valves (CV4) and (CV5) by solenoid (SOL1) thereby closing these valves so that there is no backflow or leakage flow through these valves. When check valves (CV8) and (CV9) are pilot pressure opened to allow flow of pressured fluid through the valves in response to the pressured liquid flow selected by solenoid (SOL2) this allows pressured liquid to flow through valve (CV8) to a pressure reducing valve (PRV1) and depressed check valve (C10) through connecting conduit means to the left side of the piston in C1 causing it to move to the right and close an attached plug valve until seated with the riser 44 inlet of FIG. II and remain closed in response to the selected fluid pressure imposed upon the piston. Once seated, the closure force developed is a function of the predetermined and selected pressure for the pressure reducing valve (PRV1). When no fluid flow is involved, the applied pressure force will be the (PRV1) selected pressure multiplied by the piston or cylinder cross-sectioned area. In a specific application, the cylinder area is about 19.64 sq. inches which is equivalent to about 1964 lbs./100 sq. inches of plug valve-riser inlet surface area contact. Thus to maintain 12,000 lbs. force on the plug valve when closed requires a system pressure of about 611 psig. This force may be moderated by changing the pressure relief valve pressure setting for (PRV1).

An important aspect of the hydraulic control system discussed is the ability of the system in response to (PRV1) to allow excess fluid pressure developed by the control system to flow back to the reservoir by CV8 or CV9 as pressure is imposed on cylinder C1 by the attached plug valve when in direct communication with the riser inlet in response to thermal changes in the riser 44 length particularly during startup and shutdown. The modulated and pressure controlled hydraulic system discussed is designed to compensate for riser length variations up to 6 or 8 or more inches depending on riser length and thermal growth influence. Furthermore the operation is sufficiently responsive to permit rapid change in plug valve setting in response to process generated input signal including up to full closure of the plug valve with the riser opening in a time limited not to exceed about 15 seconds or less depending on initial plug valve position. Prior art systems requiring up to about three minutes are considered unsatisfactory in present day operating technology.

The control system above identified and adapted to regulate positioning of plug valve 45 of FIG. II by cylinder C1 of FIG. V responds rapidly to process variations signaled to (SV1) comprising temperature requirements, catalyst to oil ratio and variations in feed composition thereby contributing to a much smoother operation of reduced operating fluctuations when attached to a given circulating fluid solids system comprising hydrocarbon contact and solids regeneration. Other advantages of the plug valve control and positioning system above discussed will become evident to those skilled in the art when processing high boiling oil feeds comprising crude oils, reduced crudes and residual oils comprising Conradson carbon producing components and metal contaminants and when processing such feeds over relatively inert fluid solids or cracking catalyst particles of acceptable cracking activity and/or surface area.

Referring now to FIG. VI and VII viewed together, there is shown in detail the improved plug-valve arrangement employed as plug valve 45 in the system of FIG. II. In FIG. VI there is shown a bottom end portion of riser 44 shown in FIG. II in matching alignment with the plug portion 90 of the hollow stem plug valve. In a specific embodiment, the plug portion of the valve is a portion of a cone sloped to include an apex angle of about 20 degrees. On the other hand, the matching inner surface of the riser inlet is sloped to correspond with a cone of 18 degree apex angle. The end plug portion 90 is attached either rigidly or by other means not shown to a long cylindrical hollow stem 92. A cylindrical member 94 of larger diameter than stem 92 provides an annular space 96 to shroud the upper end of stem 92 as herein provided. Cylinder member 96 is attached rigidly to stem 92 adjacent the plug portion 90 but remains open in a bottom portion to permit movement over cylindrical conduit 98 provided with an annular frictional slip fitting or member 100. A very thin gaseous material passageway is provided between the inner wall bottom portion of cylindrical section 94 and the outer wall of cylindrical section 98 to provide an outlet for gaseous material from annular space 96 and conveyed thereto from annular space 102 through the slip fitting 100 and wall section 92. Slip fitting 100 is rigidly affixed to the upper end of cylindrical section 98.

Referring now to companion FIG. VII, the bottom portion of the hollow stem plug valve is particularly depicted. That is inner cylindrical portion corresponds to 92 of FIG. VI in association with annular space 102 and the outer cylindrical portion 98. Annular slip fittings 104 and 106 rigidly attached to cylindrical conduit 98 in an intermediate and bottom portion maintain alignment of the vertically movable hollow stem plug valve assembly comprising cylindrical member 92 and plug portion 90.

A lower portion of the valve assembly is housed in a protective chamber 108 positioned within an open upper end cylindrical well member not shown and attached to the bottom head of regeneration chamber 2 of FIG. II. The bottom end of cylindrical member 92 is attached to a rod member 110 by conical means 112 through which gaseous material can flow when charged by inlet means 114 to chamber 116 confined within cylinder 118. Rod 110 above identified is connected to the piston in cylinder CV1 of FIG. V. Thus CV1 controls the vertical movement of the hollow stem plug valve 92 by rod 110 within. slip fitting 100, 102 and 106. Gaseous material such as air or other suitable purge gas is introduced to the valve assembly above identified by conduit means 120 communicating with passageways 122 to provide purge gas to annular zone 102 outside of cylindrical member 92. Purge gas passes between the slip fittings identified and the outer wall of pipe 92 as a seal gas to prevent very fine catalyst particles from entering the slip joint arrangement of the movable plug valve.

Having thus generally described the improved method and means of this invention and discussed specific embodiments related thereto in greater detail it is to be understood that no undue restrictions are to be imposed by reasons thereof except as defined by the following claims.

We claim:

1. A method for controlling a vertically movable plug valve in alignment with the inlet of a riser conduit zone during startup and shutdown to maintain pressure between the surface of said plug valve and the surface of said inlet to said riser conduit zone within a preselected range in response to electric signals which are proportional to pressure between said surfaces of said plug valve and said riser inlet, said method comprising:

selecting a range of closed pressure between said surfaces of said plug valve and said riser inlet;

transmitting said electric signal to a main servo control valve in a hydraulic fluid pressured hydraulic modulating system which comprises pilot pressure operated check valves for controlling the flow of hydraulic fluid to move said plug valve;

effecting controlled movement through said hydraulic system of a piston within a cylinder which piston is attached to the stem of said plug valve;

moving said piston in one or the other direction in response to said electric signal by varying the flow of hydraulic fluid in said hydraulic system in response to the application of pilot back pressure on said check valves in said hydraulic system; and flowing fluid back to or from a reservoir in response to said electric signals as pressure is imposed on said piston by said plug valve by expansion or contraction of said riser as a result of thermal changes in said riser when said plug valve is in direct communication with said riser inlet to maintain closed pressure between said surfaces of said plug valve and said riser inlet within said selected pressure range.

2. The method of claim 1 wherein said hydraulic system effects movement of said plug valve to compensate for thermal changes in riser length to maintain closed pressure between said plug valve and said inlet within said preselected range without exceeding about 15 seconds to accomplish said movement.

3. A method for controlling movement of a vertically movable plug valve in alignment with an inlet of a riser conduit during startup or shutdown of a catalytic conversion apparatus to compensate for thermal expansion or contraction of said riser to prevent flow of catalyst through said plug valve said method comprising:

(a) selecting a range of positive closed pressure between the surface of said plug valve and the surface of said riser conduit inlet;

(b) sensing closed pressure between the surface of said plug valve and the surface of said riser conduit inlet; and (c) adjusting the position of said plug valve with respect to said riser conduit inlet when said sensed closed pressure is not within said selected range until said sensed closed pressure is within said selected range.

4. A method according to claim 3, further comprising lowering said plug valve with respect to said riser conduit inlet when said sensed closed pressure is greater than the highest value in said selected range and raising said plug valve with respect to said riser conduit inlet when said sensed closed pressure is less than the lowest value of said selected range.

5. A method according to claim 4, wherein said step of adjusting comprises flowing hydraulic fluid from said plug valve to a hydraulic fluid reservoir when said sensed closed pressure is greater than the highest value in said selected range and wherein said step of adjusting comprises flowing hydraulic fluid to said plug valve from a hydraulic fluid reservoir when said sensed closed pressure is less than the lowest value of said selected range.

6. A method according to claim 3, wherein said step of adjusting is achieved in less than about fifteen seconds of said step of sensing.

* * * * *